US012566682B2

(12) United States Patent (10) Patent No.: US 12,566,682 B2
Cao et al. (45) Date of Patent: *Mar. 3, 2026

(54) RESILIENT FULLY SHARDED DATA PARALLEL

(71) Applicant: HEWLETT PACKARD ENTERPRISE DEVELOPMENT LP, Spring, TX (US)

(72) Inventors: Lianjie Cao, Milpitas, CA (US); Saeed Rashidi, Spring, TX (US); Puneet Sharma, Milpitas, CA (US); Garrett Goon, Spring, TX (US); Paolo Faraboschi, Barcelona (ES)

(73) Assignee: Hewlett Packard Enterprise Development LP, Spring, TX (US)

( * ) Notice: Subject to any disclaimer, the term of this patent is extended or adjusted under 35 U.S.C. 154(b) by 73 days.

This patent is subject to a terminal disclaimer.

(21) Appl. No.: 18/634,065

(22) Filed: Apr. 12, 2024

(65) Prior Publication Data

US 2025/0321839 A1 Oct. 16, 2025

(51) Int. Cl.
 *G06F 11/20* (2006.01)
 *G06N 3/098* (2023.01)
(52) U.S. Cl.
 CPC ......... *G06F 11/2028* (2013.01); *G06N 3/098* (2023.01)
(58) Field of Classification Search
 CPC ............. G06F 11/2028; G06F 11/2056; G06F 11/2064; G06F 11/2082; G06F 11/2097; G06N 3/098
 See application file for complete search history.

(56) References Cited

U.S. PATENT DOCUMENTS

2011/0035556 A1* 2/2011 Aho .................. G06F 15/17331
 711/147
2015/0324690 A1* 11/2015 Chilimbi ................ G06N 3/063
 706/27
2017/0187766 A1* 6/2017 Zheng ..................... H04L 67/02
 (Continued)

OTHER PUBLICATIONS

Huang et al., "GPipe: Efficient Training of Giant Neural Networks using Pipeline Parallelism", 33rd Conference on Neural Information Processing Systems (NeurIPS 2019, 10 pages.

(Continued)

*Primary Examiner* — Gabriel Chu
(74) *Attorney, Agent, or Firm* — Sheppard Mullin Richter & Hampton LLP

(57) ABSTRACT

Systems and methods are provided for failure resiliency in distributed training of machine learning (ML) models. Examples include a plurality of compute nodes storing shards of a plurality of shards of model states of an ML model, and a first compute node storing a first shard of model states of the ML model. The first compute node can store a plurality of shard portions. Each shard portion can be received from a respective compute node of the plurality of compute nodes and can be a replica of a portion of a respective shard, of the plurality of shards, stored at the respective compute node. Responsive to a failure of a compute node of the plurality of compute nodes, the first compute node can update the first shard with a shard portion corresponding to the failed compute node and the ML model can be trained based on the updated first shard.

20 Claims, 8 Drawing Sheets

(56) References Cited

U.S. PATENT DOCUMENTS

2021/0232451 A1\*  7/2021  Pudipeddi ............. G06N 3/063
2022/0067577 A1\*  3/2022  Serebryakov ........... G06N 3/08

OTHER PUBLICATIONS

Jia et al., "Beyond Data and Model Parallelism for Deep Neural Networks", Jul. 14, 2018, 15 pages.
Narayanan et al., "Efficient Large-Scale Language Model Training on GPU Clusters Using Megatron-LM", ACM, Nov. 14-19, 2021, 13 Pages.
Narayanan et al., "PipeDream: Generalized Pipeline Parallelism for DNN Training", ACM, Oct. 27-30, 2019, 15 pages.
Rajbhandari et al., "ZeRO-Infinity: Breaking the GPU Memory Wall for Extreme Scale Deep Learning", Apr. 16, 2021,14 pages.
Rajbhandari et al., "ZeRO: Memory Optimizations Toward Training Trillion Parameter Models", May 13, 2020, 24 pages.
Ren et al., "ZeRO-Offload: Democratizing Billion-Scale Model Training", Jan. 18, 2021, 14 pages.
Zhao et al., "PyTorch FSDP: Experiences on Scaling Fully Sharded Data Parallel", Sep. 12, 2023, 13 pages.

\* cited by examiner

100

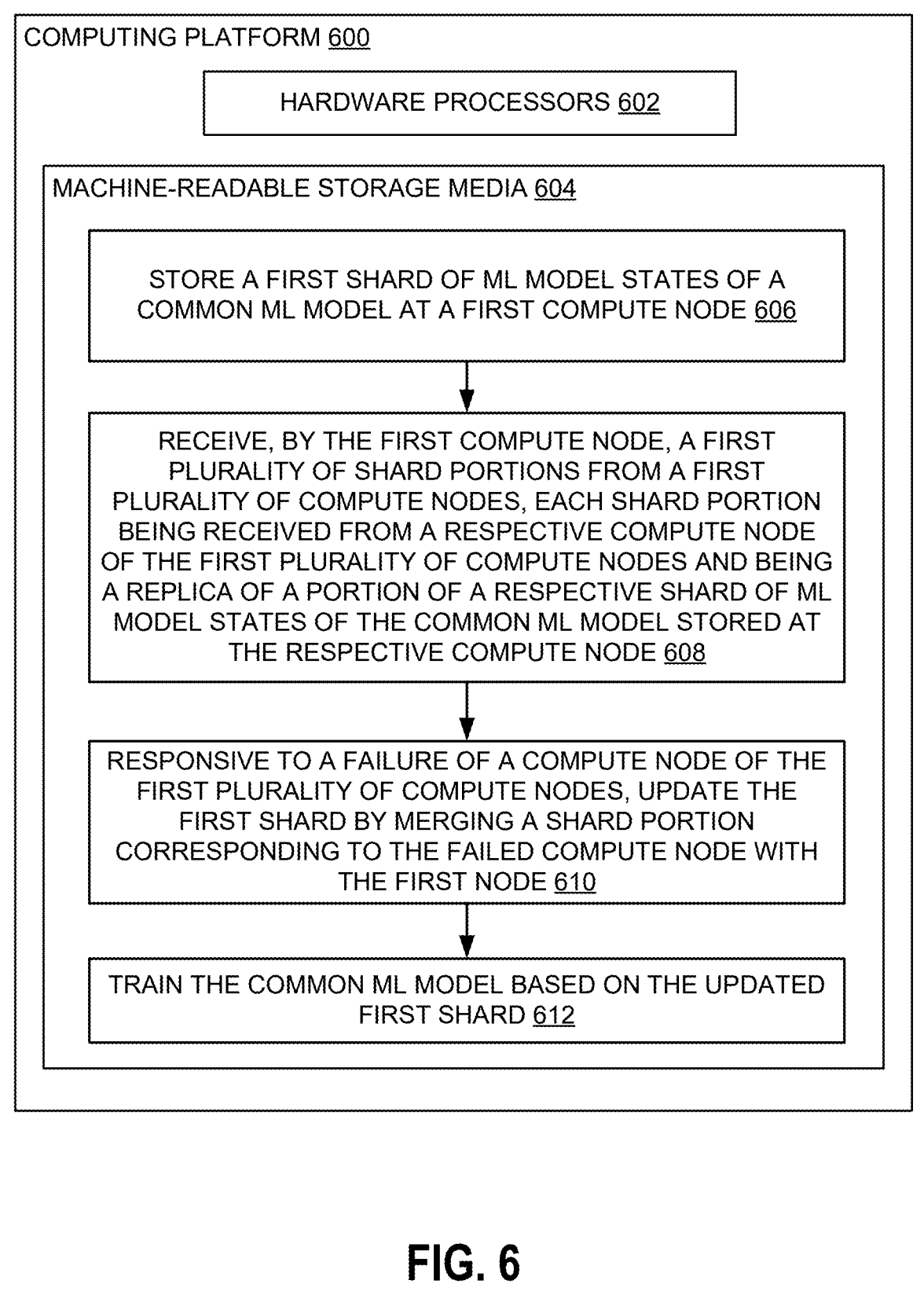

COMPUTING PLATFORM 600

HARDWARE PROCESSORS 602

MACHINE-READABLE STORAGE MEDIA 604

STORE A FIRST SHARD OF ML MODEL STATES OF A COMMON ML MODEL AT A FIRST COMPUTE NODE 606

↓

RECEIVE, BY THE FIRST COMPUTE NODE, A FIRST PLURALITY OF SHARD PORTIONS FROM A FIRST PLURALITY OF COMPUTE NODES, EACH SHARD PORTION BEING RECEIVED FROM A RESPECTIVE COMPUTE NODE OF THE FIRST PLURALITY OF COMPUTE NODES AND BEING A REPLICA OF A PORTION OF A RESPECTIVE SHARD OF ML MODEL STATES OF THE COMMON ML MODEL STORED AT THE RESPECTIVE COMPUTE NODE 608

↓

RESPONSIVE TO A FAILURE OF A COMPUTE NODE OF THE FIRST PLURALITY OF COMPUTE NODES, UPDATE THE FIRST SHARD BY MERGING A SHARD PORTION CORRESPONDING TO THE FAILED COMPUTE NODE WITH THE FIRST NODE 610

↓

TRAIN THE COMMON ML MODEL BASED ON THE UPDATED FIRST SHARD 612

FIG. 6

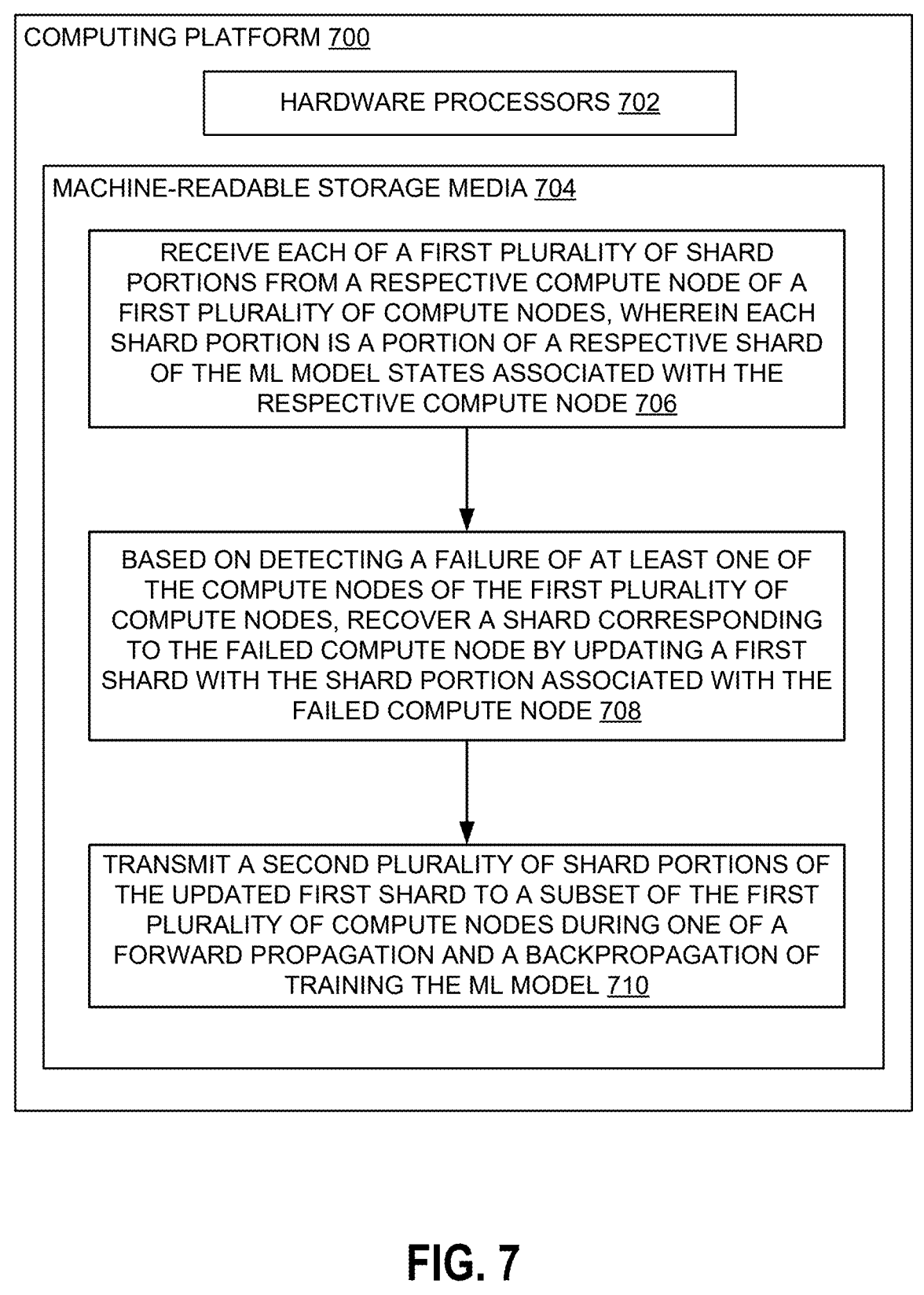

COMPUTING PLATFORM 700

HARDWARE PROCESSORS 702

MACHINE-READABLE STORAGE MEDIA 704

RECEIVE EACH OF A FIRST PLURALITY OF SHARD PORTIONS FROM A RESPECTIVE COMPUTE NODE OF A FIRST PLURALITY OF COMPUTE NODES, WHEREIN EACH SHARD PORTION IS A PORTION OF A RESPECTIVE SHARD OF THE ML MODEL STATES ASSOCIATED WITH THE RESPECTIVE COMPUTE NODE 706

BASED ON DETECTING A FAILURE OF AT LEAST ONE OF THE COMPUTE NODES OF THE FIRST PLURALITY OF COMPUTE NODES, RECOVER A SHARD CORRESPONDING TO THE FAILED COMPUTE NODE BY UPDATING A FIRST SHARD WITH THE SHARD PORTION ASSOCIATED WITH THE FAILED COMPUTE NODE 708

TRANSMIT A SECOND PLURALITY OF SHARD PORTIONS OF THE UPDATED FIRST SHARD TO A SUBSET OF THE FIRST PLURALITY OF COMPUTE NODES DURING ONE OF A FORWARD PROPAGATION AND A BACKPROPAGATION OF TRAINING THE ML MODEL 710

FIG. 7

RESILIENT FULLY SHARDED DATA PARALLEL

BACKGROUND

Machine learning (ML) generally involves a computer-implemented process that builds a model using sample data (e.g., training data) in order to make predictions or decisions without being explicitly programmed to do so. ML processes are used in a wide variety of applications, particularly where it is difficult or unfeasible to develop conventional algorithms to perform various computing tasks.

Distributed training is a sub-field of ML in which multiple decentralized entities collaboratively train a common ML model using parallel execution on subsets of data or parameters held locally at each entity. Distributed training approaches stand in contrast to traditional centralized ML techniques where training is performed sequentially on a single compute node.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 6 is an example computing component that may be used to implement various features of distributed training failure resiliency in accordance with the implementations disclosed herein.

FIG. 7 is another example computing component that may be used to implement various features of distributed training failure resiliency in accordance with the implementations disclosed herein.

Figure 1:
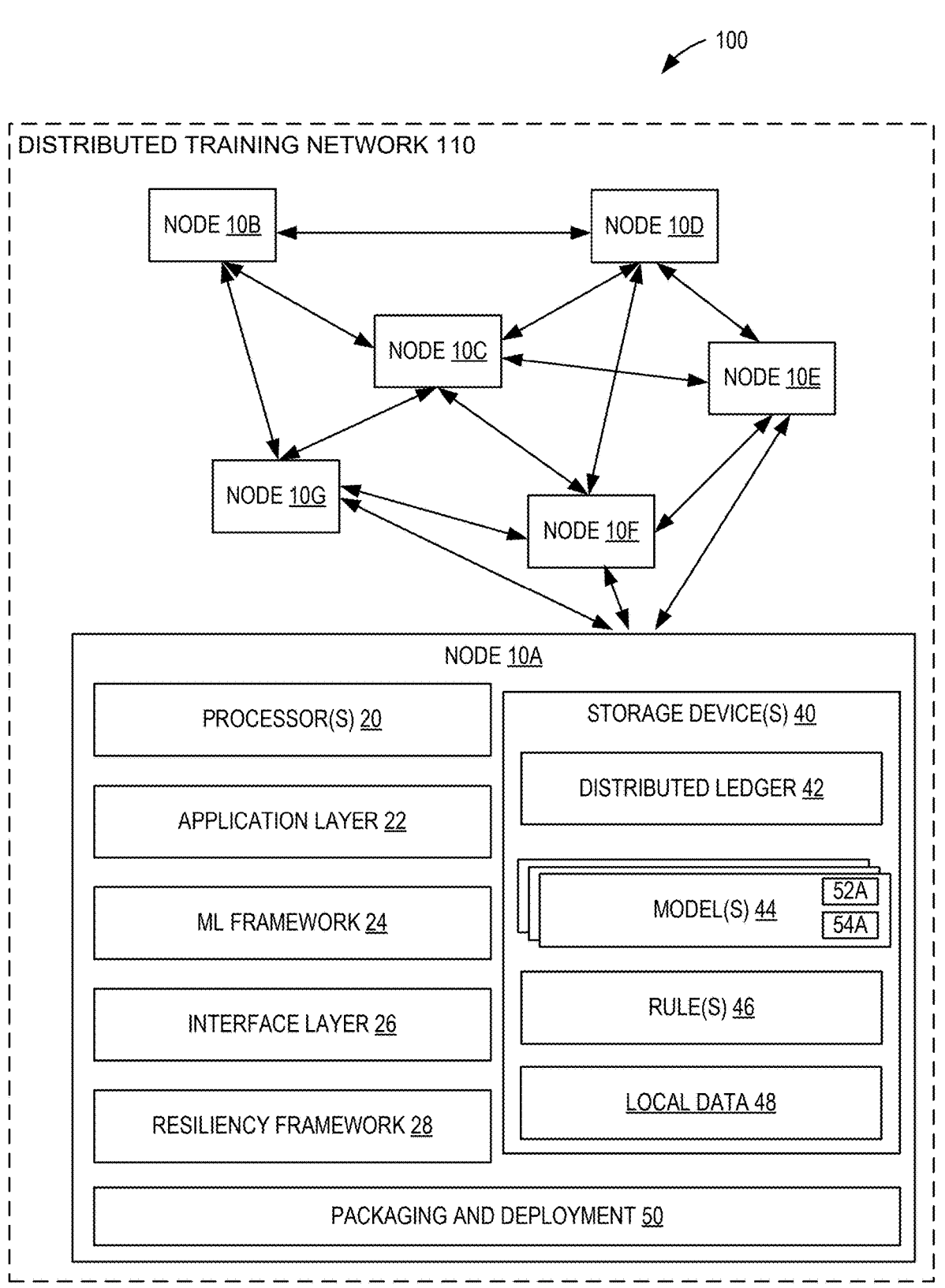
FIG. 1 illustrates an example system for distributed training, according to an example implementation of the present disclosure.

The figures are not exhaustive and do not limit the present disclosure to the precise form disclosed.

DETAILED DESCRIPTION

Training ML models at a large scale can be a challenging task that may require a significant amount of computational power and resources, as well as time. For example, large language models (LLMs) may consist of a number of parameters that are trained, and the number of such parameters has increased from 110 million in 2018 to one trillion in 2021. To effectively train these large scale LLMs, as well as other large scale ML models, distributed training algorithms have been proposed that partition the training job across a number of computational resources (also referred to as "compute nodes" or "nodes") of a distributed training network. For example, data parallelism (DP) can replicate an entire model on each compute node and split training datasets into multiple segments for each compute node. Another example is Pipeline Parallelism (PP), which partitions an ML model into stages and distributes the stages across multiple compute nodes. Tensor parallelism (TP), which is yet another approach, slices tensors into multiple chunks, each of which can be executed on a compute node. However, these techniques are generally coupled with a specific model architecture and can be difficult to generalize for other models. For example, tensor parallelism may require tight coupling of the compute nodes because parallelizing a matrix multiplication can be communication intensive, so it only works across compute elements (e.g., GPUs) within a single server. The efficiency of pipeline parallelism can depends on the model itself, and can generate inefficient execution (so-called "pipeline bubbles") when the model is irregular.

Fully sharded data parallel (FSDP) is another parallelization technique for distributed ML. FSDP shards (e.g., divides or otherwise partitions) model parameters, such as weight and optimizer states, across a network of nodes. Each compute node can operate on a different set of training data that is locally held at the respective compute node (referred to herein as "local training data" or "local data"). FSDP comprises at least two training phases: a forward propagation phase (sometimes referred to as "forward pass") and backward propagation phase (sometimes referred to as "backward pass").

The forward propagation phase can be performed to obtain outputs of a common ML model from local inputs. For example, an ML model can comprise multiple layers, each of which configured to perform different transformations on one or more inputs. The transformations performed by each layer can be dependent on weight states (sometimes referred to herein as "weights") that are learned for each layer through training. The first layer of the model may be referred to as an input layer and the last layer may be referred to as an output layer. The input layer can be supplied training data as an input. Multiple intermediate layers (sometimes referred to as "hidden layers") may be provide in a sequential order between the input layer and output layer. Outputs from one layer are fed as inputs to the sequentially next layer. The forward propagation phase is used to compute outputs from each layer along the sequential order from the input layer to the output layer.

In the case of FSDP, during the forward propagation phase, each compute node operates to compute local outputs from each layer of the common ML model by applying inputs locally held by the respective compute node. As noted above, each compute node holds shards of model parameters for each layer, such as shards of weight and bias states (referred to herein as a "weight shards") and shards of optimizer states (referred to herein as "optimizer shards") for each layer. To perform the transformation from inputs to outputs, each compute node performs an all-gather operation, for each layer, to collect weight shards held at the other compute nodes and reconstructs the full layer. Once the full layer is obtained, each compute nodes executes a forward compute operation by feeding locally held inputs to the reconstructed layer to obtain outputs for that layer. Each compute node then discards the weight shards associated with the other nodes (e.g., received from the other nodes) to free up space to repeat the process for the sequentially next layer using the obtained outputs as inputs. The process is repeated for each layer until the compute nodes obtain the outputs for the final layer.

The backward propagation phase can be performed to update model parameters of the ML model by obtaining loss functions from a previous layer. The backward propagation phase computes one or more gradients of a loss function with respect to the weight states of a given layer. The backward propagation phase performs a backward-pass compute operation to obtain the gradients one layer at a time, iterating backward from the output layer to the input layer. The backward propagation phase can utilize gradient descent, or variants such as stochastic gradient descent to perform the backward compute operation. The backward propagation phase can utilize an optimization algorithm, which may be defined by the optimizer states, to compute updated weights with respect to the obtained gradients. The term "optimizer state" can refer to a momentum vector or similar history-tracking properties of an optimization algorithm. For example, an optimizer state for a gradient descent optimization algorithm can track moving averages of the gradient and squared gradient.

In the case of FSDP, during backward propagation, each node operates to update the weight states of its weight shard by applying its optimizer shard with respect to gradients corresponding to its weight shard. For example, for each layer, each compute node performs an all-gather operation to collect the weight shards from the other nodes and reconstruct the full layer. Once the full layer is obtained, each compute node performs a backward-pass compute operation to compute weight gradients and input gradients for the current layer with respect to weights of the fully reconstructed layer. Each node then discards the weight shards collected from other nodes to free up space for the next layer. At this stage, each compute nodes holds weight gradients corresponding to each weight shard with respect to respective local inputs. Each node may then perform a reduce-scatter operation to obtain global weight gradients, with respect to all inputs, corresponding to its respective weight shard, and update weights of its respective shard with respect to the global weight gradients.

Conventional implementations of FSDP do not provide resiliency to recover shards of model parameters in the event of a node failure, malfunction, or other anomalous behavior that results in the node becoming unavailable for distributed training (referred to herein as a functional failure). Thus, when a compute node becomes unavailable for the distributed training, the corresponding model parameters held by that node may be lost and may need to be re-learned by re-initializing the entire process, at least with respect to the lost parameters. Accordingly, a failure to a single node may significantly disrupt a learning process, which can be exacerbated in the case of large scale ML training consisting of hundreds or thousands of compute nodes.

The present disclosure provides for a failure resiliency approach that can be implemented in the FSDP framework to protect against such node failures through sharing of portions of shards amongst the compute nodes. In examples herein, each compute node may hold (e.g., store) local shards of model states (sometimes referred to herein as a "training shard") and copies of portions of shards of model states (referred to herein as "replicated shard portions") stored at the other compute nodes of a distributed training network. Each compute node can be responsible for obtaining outputs using its training shard with respect to local inputs during the forward propagation phase and updating its training shard with respect to obtained gradients during the backward propagation phase. To achieve resiliency from failures, each compute node can replicate its training shard, partition the replicated training shard into replicated shard portions, and distribute the replicated shard portions to the other compute nodes through an all-gather operation executed during one of the forward propagation phase and backward propagation phase. Thus, each compute node may hold replicated shard portions received from each of the other nodes on the network. According to some examples, each training shard can be replicated and partitioned into a number (N) of equally sized replicated shard portions, where N is one less than the number of compute nodes utilized for the training. Upon detecting a failure of a compute node, each remaining node (referred to herein as "functional nodes") can update its respective training shard with a replicated shard portion corresponding to the failed node (e.g., a replicated shard portion originating or received from the failed node during the preceding all-gather operation). As a result, the updated training shard can comprise the prior training shard merged with the replicated shard portion of the failed node.

To provide for further resiliency from a subsequent node failure, each functional node can replicate and partition its updated training shard, which can be distributed to the remaining functional nodes during the next all-gather operation. The next all-gather operation may be an all-gather operation of the forward propagation or backpropagation, depending on current phase the training. As such, the most recent model states for the failed node can be maintained and updated across the network and may not be lost due to the failure. Thus, the remaining functional nodes can continue with uninterrupted training of the ML mode.

Accordingly, implementations of the present disclosure can provide for resiliency from node failure without adding communication costs by leveraging the all-gather operation, during which shards of weights are shared between the compute nodes, performed during the FSDP framework. Furthermore, by dividing the model states contained in the shard of the failed node evenly across the functional nodes, the workload can be shared equally be each functional node, thereby minimizing computation overhead in terms of compute power and resources.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.]

FIG. 1 illustrates an example system 100 for distributed training, according to an example implementation of the present disclosure. Example system 100 comprises a distributed training network 110 with a plurality of compute nodes 10A-10G in a cluster or group of compute nodes (also referred to collectively as nodes 10 or individually as nodes 10A-10G).

Each node 10 may be coupled to other nodes 10 via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. Furthermore, according to various implementations, the components described herein may be implemented in hardware and/or software that configure hardware.

The plurality of nodes 10 in the cluster of the distributed training network 110 may comprise any number, configuration, and connections between nodes 10. As such, the arrangement of nodes 10 shown in FIG. 1 is for illustrative purposes only. Node 10 may be a fixed or mobile computing device. While node 10A is illustrated in detail in FIG. 1, each of nodes 10 may be configured in the manner illustrated. In the example of FIG. 1, node 10A includes one or more processors 20 (interchangeably referred to herein as processors 20, processor(s) 20, or processor 20 for convenience) and one or more storage devices 40 (interchangeably referred to herein as storage devices 40, storage device(s) 40, or storage device 40 for convenience), as well as other components. In examples, one or more of the compute nodes may be implemented as a graphics processing unit (GPU). The storage device(s) 40 may hold (e.g., store) data 48 that is locally accessible to the node 10A (referred to herein as local data). The local data 48 may not be accessible to other nodes 10 in the distributed training network 110 (e.g., nodes 10B-10G in this example).

In some examples, the storage device(s) 40 may store a distributed ledger 42, one or more models 44 (interchangeably referred to herein as models 44, model(s) 44, or model 44 for convenience), and/or rule(s) 46. The distributed ledger 42 may include a series of blocks of data that reference at least another block, such as a previous block. In this manner, the blocks of data may be chained together as distributed ledger 42. The distributed ledger 42, in some examples, may store blocks that indicate a state of node 10A a relating to its machine learning during an iteration. Thus, the distributed ledger 42 may store an immutable record of the state transitions of a node 10A. In this manner, the distributed ledger 42 may store a current and historic model state of each model 44. It should be noted, however, that in some embodiments, some collection of records, models, and smart contracts from one or more of other nodes (e.g., node(s) 101B-10G) may be stored in distributed ledger 42.

Model 44 may be locally trained at a node 10 based on the local data 48, as described herein, and then updated based on model parameters learned at other nodes 10. The nature of the model 44 will be based on the particular implementation of the node 10 itself. For instance, model 44 may be defined by learned parameters relating: to self-driving vehicle features such as sensor information as it relates object detection, network configuration features for network configurations, security features relating to network security such as intrusion detection, healthcare features related to medical records and health-related information of patients, social science features related to human behavior in social and cultural sematic aspects, and/or other context-based models.

Model 44 can be stored as a local instance of an ML algorithm, as well as model parameters determined through training the ML algorithm. Model parameters can be stored as various model states, such as but not limited to, weights, biases (e.g., another form of model weights), optimizers, gradients or the like that can define a particular instance of the model 44. Each model 44 can comprise of multiple layers, with each layer defined by a set of model parameters for performing different transformations on an input. The first layer of the model may be an input layer into which local data 48 can be supplied and the last layer may be an output layer. Multiple intermediate or hidden layers may be present between the input and output layers in a sequential order, where outputs from one layer can be fed as inputs to the next layer. The transformations performed by each layer can be dependent on model parameters learned for that layer. Model(s) 44 can include any model of general class of ML algorithms, including but not limited to, many statistical and classical ML algorithms in use by verticals, such as regression-based, Decision Tree (DT), Support Vector Machine (SVM), etc. Training methods can include, but are not limited to, standard batch training.

In examples herein, model 44 can be stored as shards of model states that define local instance of an ML algorithm. For example, node 10A is illustratively shown as holding a weight shard 52A and an optimizer shard 54 of model 44 that define a local instance of the ML algorithm. Each node 10 may hold other shards that collectively define the entire common layer. The model 44 may hold a shard of model states for each layer. For example, weight shard 52A may hold weights and biases that define a transformation for one layer of the ML model and model 44 may hold one or more other weight shards that define transformation for one or more other layers of the model 44. Similarly, optimizer shard 54A may hold optimizer states that define a local instance of an optimization algorithm for one layer of the ML model (e.g., the same layer as weight shard 52A) and model 44 may hold one or more other optimizer shards for one or more other layers of the model 44.

Rules 46 may include smart contracts or computer-readable rules that configure nodes to behave in certain ways in relation to distributed training and enable decentralized control. For example, rules 46 may specify deterministic state transitions, when to initiate an iteration of machine learning, whether to permit a node to enroll in an iteration, a number of nodes required to agree to a consensus decision, a percentage of voting participant nodes required to agree to a consensus decision, and/or other actions that node 10A may take for distributed machine learning.

Rules 46 may specify hyperparameters that define how the ML framework 24 and resiliency framework 28 are structured. Hyperparameters can be thought of as a mechanism for governing the training process, e.g., deciding how many training iterations should be performed, how many nodes 10 are utilized for training, setting training stopping criteria, setting data parallelism techniques, and so on. Hyperparameters can be adjustable parameters, set in advance, that can be tuned to obtain/generate an ML model/algorithm with optimal/tuned performance. In some examples, hyperparameters may be set by an operator via a frontend dashboard.

According to examples disclosed herein, rules 46 may include one or more hyperparameters configuring the ML framework 24 to utilize FSDP techniques for distributed training. In this case, rules 46 may include one or more hyperparameters that specify a number of shards of model states to be created from parameters of a model 44. For example, rule 46 may specific a number of shards to be created from a collection of weights for a given layer of the model 44 by dividing (e.g., partitioning) weights that define the transformations of that layer into the specified number of weight shards. Similarly, a collection of optimizer states of the model 44 can be divided into the specified number of optimizer shards. Rules 46 may then allocate weight shards and optimizer shards to each node 10 for storage in, for example, storage device(s) 40. According to examples, the number of shards (e.g., the number of weight shards and the number of optimizer shards) may be specified as the number of nodes 10 enrolled for training. In various examples, each shard may be equal in size in terms of an amount of memory needed for storing each shard. That is, for example, each weight shard may be equal in size and each optimizer shard may be equal in size. However, weight shards need not be equal in size with respect to optimizer shards.

According to examples disclosed herein, rules 46 may also include one or more hyperparameters configuring the resiliency framework 28 to protect from node failures. In this case, rules 46 may include one or more hyperparameters that configure each node 10 to replicate its respective weight shard to create a copy thereof. Rules 46 may also include one or more hyperparameters that configure each node 10 to partition the replicated weight shard into a number of replicated shard portions and distribute the replicated shard portions of weight shards to other nodes 10. Each replicated shard portion may comprise data defining a distinct portion of a weight shard (e.g., in terms of weights contained therein) that do not overlap with another portion of any of the other replicated shard portions originating from the same weight shard. Thus, the replicated shard portions can collectively recreate the entire weight shard. The number of replicated shard portions created may be based on the number of nodes 10 that are operating or otherwise functioning as expected to perform distributed training. For example, the number of replicated shard portions may be one less than the number of nodes 10 enrolled for training.

Rules 46 may also comprise one or more checks for detecting node failures, such as a functional failure of a node or the like. A functional failure may refer to a situation in which a compute node becomes unavailable for the distributed training, e.g., the node becomes non-functioning or otherwise a non-participant in the training. In some cases, a node failure may cause damage to the storage device(s) 40 of the failed node that can result in loss of model parameters held by the failed node. While in other cases, even if the model parameters are not lost, a non-participating node may not update its model parameters along the training, which means when the node is re-inserted into the training it will have to catchup to the other nodes.

A node may become functionally unavailable for distributed training due to, for example but not limited to, functional failures (also referred to as malfunctions) of a node. A functional failure may include any failure of the compute node, including hardware failures, as well as anomalous behavior demonstrated by the compute node. A hardware failure may refer to a situation in which hardware components of a compute node have failed or otherwise not operating as intended. Anomalous behaviors may include, but are not limited to, software failures (e.g., compute node hardware is functional, but the software hangs up or otherwise fails to execute as expected), networking failures (e.g., the compute node operates as expected, but the compute node is unreachable because a switch port is dead or other defect in the link between the compute node and other nodes), and performance failures (e.g., the compute node cannot provide its shards to other compute nodes within a reasonable amount of time).

Examples herein may utilize any technique for detecting such node failures. Some illustrative examples are provided herein, but are not intended to be limiting, any method or technique for detecting node failures or unavailability may be used in the examples disclosed herein. In some examples, a management system, implemented by a node 10, may be provided in the distributed training network 110 that monitors each participating node 10, detects when a node 10 has failed or others is no longer participating, and generates alerts that can be provided to the remaining functional nodes 10 to notify of the failure. In another example, the ML framework 24 may include a watchdog process configured to monitor the learning process. Each node 10 may be expected to produce certain data and exchange the data with other nodes 10 at certain times as part of a the ML framework 24. The watchdog process may be configured to monitor for the expected data exchanges and if an expected communication is not received within the expected amount of time, the watchdog process may alert the node 10 of a failure. The node that failed to provide the expected communication can be identified as a failed node.

Processor(s) 20 may obtain local data 48 accessible locally to node 10A but not necessarily accessible to other nodes 10A. Such local data 48 may include, for example, private data not intended to be shared with other devices. Processor(s) 20 may be programmed by one or more computer program instructions. For example, processors 20 may be programmed to execute application layer 22, ML framework 24, interface layer 26, resiliency framework 28, or other instructions to perform various operations, each of which are described in greater detail herein. As used herein, for convenience, the various instructions will be described as performing an operation, when, in fact, the various instructions program processors 20 (and therefore node 10A) to perform the operation.

Application layer 22 may execute applications on the node 10A. For instance, application layer 22 may include an agent (not illustrated) that programs node 10A to participate in a distributed machine learning across distributed training network 110 as described herein. In examples, each node 10 may be programmed with the same agent, thereby ensuring that each acts according to the same set rules, such as those which may be encoded using rules 46. For example, the agent may program each node 10, according to hyperparameters specified by rules 46, to act as a participant node. Application layer 22 may execute machine learning through the ML framework 24 and resiliency framework 28, for example, according to the process further described below in connection with FIGS. 2-6.

ML framework 24 may train a model based on local data 48 held at node 10A. For example, ML framework 24 may generate one or more model parameters by applying the local data 48 to a local instance of an ML algorithm (e.g., model 44). The ML framework 24 learns weights, bias, optimizers, and/or gradients as one or more model parameters (referred to interchangeably herein as "one or more local parameters" or "local parameter(s)"), which can define a particular model 44 and stored in storage device 40. In an example, the ML framework 24 may use the FSDP framework, although other frameworks may be used as well.

According to various examples, the ML framework 24 may use FSDP to distribute the training across the nodes 10. For example, The ML framework 24 may execute multiple phases of training. In the case of distributed training through FSDP, the ML framework 24 operates on local training data 48 and performs a forward propagation phase and backward propagation phase to obtain model parameters. The ML framework 24 can perform the forward propagation phase to obtain outputs of a model 44 from inputs by iterating forward through each layer from the input layer to the output layer. The ML framework 24 can also perform the backward propagation phase to adjust the weights of the model 44 by computing gradients as a loss function with respect to weights of a given layer and local inputs by iterating backward from the last layer to the first layer. Additional details are provided below in connection with FIGS. 2-3.

Application layer 22 may use interface layer 26 to interact with and participate in the distributed training network 110 for collaborative machine learning across multiple partici- pant nodes 10. Interface layer 26 may communicate with other nodes by, for example, broadcasting transactions and writing blocks to the distributed ledger 42 based on those transactions.

Interface layer 26 may share the local model parameter(s) and inferences with the other participant nodes 10. Interface layer 26 may include a messaging interface used to com- municate via a network with other participant nodes 10. The messaging interface may be configured as an Message Passing Interface (MPI) send/receive operation. Other types of messaging interfaces may be used as well.

Resiliency framework 28 may ensure distributed training is resilient to node failures on the distributed training network 110. For example, resiliency framework 28 may be executed by node 10A to replicate weight shard 52A and partition the replicated weight shard into a plurality of replicated shard portions according to rules 46. Resiliency framework 28 may be also be executed to distribute the replicated shard portions to the other nodes 10 of the distributed training network 110, for example, by transmit- ting a distinct replicated shard portion to each of the other nodes 10. Each node 10 may similarly execute a respective resiliency framework to create replicated shard portions of respective weight shards and distribute the replicated shard portions to other nodes 10. Node 10A may execute resiliency framework 28 to receive a replicated shard portion from each of the other nodes on the network and hold the received replicated shard portions in storage device(s) 40. As a result, each node 10 may hold distinct replicated shard portions received (e.g., originating) from each of the other nodes 10.

The resiliency framework 28 may detect a node failure, according to rules 46. Upon detecting a node failure, each remaining functional node 10 (e.g., the remaining nodes 10 other than the failed node) can update its respective weight shard based on a replicated shard portion, held at the respective functional node 10, associated with the failed node. As an illustrative example, node 10A can execute resiliency framework 28 to update weight shard 52A using a replicated shard portion that node 10A received from the failed node prior to the detected failure. In examples, weight shard 52A can be updated by merging the replicated shard portion with the local weight shard 52A to produce an updated weight shard. The updating of local weight shards can be executed at each node 10 that remains functioning and participating in the training. As a result, weights con- tained in the weight shard of the failed node may not be lost and can be maintained in the updated weight shards of the remaining nodes 10. The updated local weight shards of the nodes 10 can be utilized by the ML framework 24 to continue distributed training without interruption stemming from the detected failure.

In some implementations, node 10A can include packag- ing and deployment 50 that may package and deploy a model 44 as a containerized object. For example, packaging and deployment 50 may package local model parameter(s) and other inferences into a containerized object that can be shared with other participant nodes 10 via the interface layer 26. For example, and without limitation, packaging and deployment 50 may use the Docker platform to generate Docker files that include models 44. In another example, packaging and deployment 50 may use the Docker platform to generate Docker files that include weight shards 52A or replicated shard portions. Other containerization platforms may be used as well. In this manner various applications at node 10 may access and use the model 44 in a platform- independent manner. As such, the models may not only be built based on collective parameters from nodes in a dis- tributed training network, but also be packaged and deployed in diverse environments.

Figure 2:
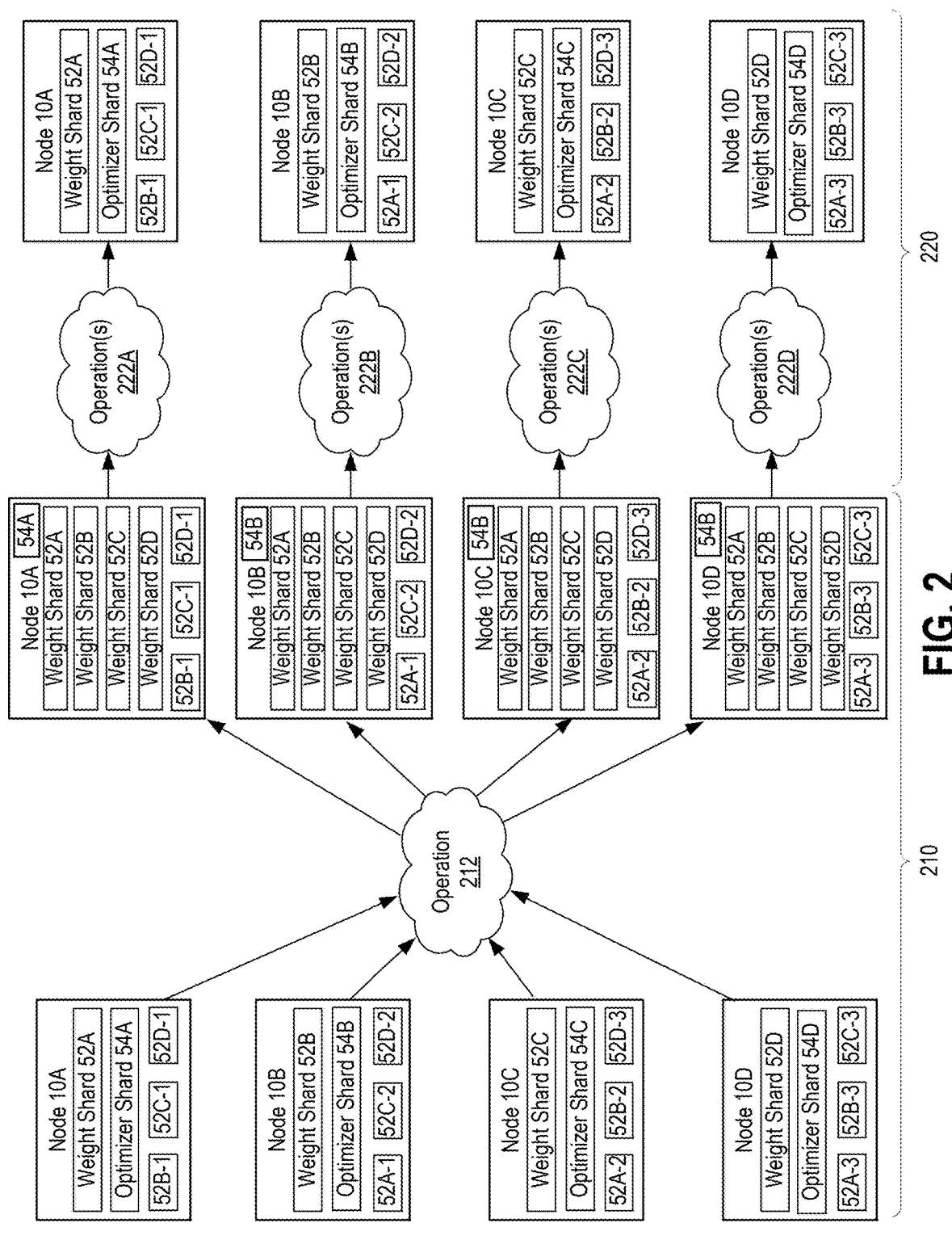
FIG. 2 is a schematic block diagram depicting a forward propagation phase in distributed training, according to example implementations of the present disclosure.

FIG. 2 is a schematic block diagram of a process flow for a forward propagation phase 200 in distributed training, according to example implementations of the present dis- closure. In the example of FIG. 2, the forward propagation phase 200 can be performed by a plurality of nodes 10, as described in connection with FIG. 1. Accordingly, one or more of the operations of forward propagation phase 200 may be performed by, for example, by one or more of the application layer 22, ML framework 24, interface layer 26, and/or resiliency framework 28, as executed by processor(s) 20. In the example shown in FIG. 2, the forward propagation phase 200 is illustratively depicted as performed by four nodes 10A-10D. However, forward propagation phase 200 can be performed by any number of nodes as desired for a given application of machine learning.

The process of the forward propagation phase 200 can be iteratively performed for each layer of an ML model (e.g., model 44 of FIG. 1) to obtain outputs of each layer based on inputs applied by each node 10. The outputs obtained from one iteration may be used as inputs for a next iteration of forward propagation phase 200. Forward propagation phase 200 comprises multiple operations that are illustratively depicted in FIG. 2 as grouped into steps 210 and 220. Forward propagation phase 200 can execute steps 210 and 220 for each layer of the ML model, starting with the first layer (e.g., input layer) and iterating a number of middle layers (e.g., hidden layers) to the last layer (e.g., output layer) according to the sequential order of the layers.

Prior to performing a first iteration of forward propagation phase 200 on the first layer, enrollment may occur whereby each node 10A-10D may enroll or register itself for use in distributed learning. In one example, this can be a one-time process. In other examples, enrollment or registration may be performed after some time as a type of verification process. In examples, each node 10 can subsequently record its relevant attributes in a learning contract, e.g., the uniform resource locator (URL) from which its local set of model parameters can be downloaded by other nodes.

Additionally, prior to performing a first iteration of for- ward propagation phase 200, hyperparameters can be loaded from storage device(s) 40, for example, into the ML frame- work 24 of each node. As noted above, hyperparameters that define how the ML framework 24 and resiliency framework 28 are structured. Hyperparameters may be selected for use at each node and training can be performed according to those hyperparameters. In examples, the hyperparameters may govern the training process, e.g., by specifying how many nodes (e.g., nodes 10A-10D) perform training; how many weight shards are to be created; how many replicated shard portions are to be created by each node; how to detect a node failure or what processes qualify as a node failure, and so on.

In examples, the ML model being trained can be defined by a common ML algorithm that comprises various model parameters, such as weight and optimizer states. Each layer may be defined by a set of model parameters. As described above, the weights that define each layer of the ML model can be divided into a number of weight shards. In the example of FIG. 2, collective weights are divided into four weight shards 52A-52D that are allocated and stored at each node 10A-10D. For example, weight shard 52A is allocated to node 10A, weight shard 52B is allocated to node 101B, weight shard 52C is allocated to node 10C, and weight shard 52D is allocated to node 10D. Thus, each node 10A-10D can hold a weight shard 52A-52D that the respective node 10A-10D is responsible for use in performing transformations on inputs to compute outputs for each given layer. Collectively, weight shards 52A-52D, in this example, comprise weights that define a full layer.

In an example, at step 210 for a given layer, each node 10A-10D reconstructs the respective layer. For example, the ML framework 24 at each node 10A-10D performs an all-gather operation 212 to obtain weight shards from the other nodes and reconstructs the full layer from the gathered weights. For example, node 10A performs an all-gather operation 212 to obtain weight shards 52B-52D and stores weight shards 52A-52D in its storage device(s) 40. The ML framework 24 can access the storage device(s) 40 to retrieve the weights of each shard and reconstruct the full layer by applying the weights of the various weight shards to the common ML algorithm. Similarly, node 10B obtains weight shards 52A, 52C, and 52D; node 10C obtains weight shards 52A, 52B, and 52D; and node 10D obtains weight shards 52A-52C, to construct the full layer at each respective node. The weight shards 52A-52D may be considered training shards due to the utilization of the weight shards 52A-52D for training.

At step 220, the ML framework 24 of each node 10A-10D can execute operations 222A-222D to obtain outputs for the full constructed layer. For example, node 10A executes ML framework 24 to perform a forward compute operation as part of operations 222A. The ML framework 24 can perform a forward compute by feeding local inputs to the reconstructed layer of the common ML model and computes (e.g., obtains) local outputs for that layer. The reconstructed layer can perform transformations on the local inputs according to the weights of the reconstructed layer. In the case of a first iteration of forward propagation phase 200, the ML framework 24 reconstructs the first layer and applies local training data 48 as inputs to the first layer to obtain local outputs of the first layer. Node 10A can apply local outputs obtained for a given reconstructed layer as local inputs for a next reconstructed layer during a subsequent iteration of the forward propagation phase 200. While the above example is provided with reference to node 10A, each node 10B-10D can perform similar operations to obtain local outputs for each layer of the ML model based on their respective local inputs. In this way, the forward propagation phase 200 iterates through the various layers of the ML model.

Once the outputs of a given reconstructed layer are obtained, weight shards obtained from other nodes 10A-10D can be discarded to free up space for a next iteration. For example, node 10A may execute ML framework 24 to discard, delete, or otherwise remove weight shards 52B-52D from its storage device(s) 40. Similarly, node 10B may discard weight shards 52A, 52C, and 52D; node 10C may discard weight shards 52A, 52B, and 52D; and node 10D may discard weight shards 52A, 52B, and 52C.

Furthermore, each node 10A-10D can be configured, according to hyperparameters, to create copies of portions of its respective weight shard that can be distributed to other nodes 10A-10D. For example, hyperparameters may configure resiliency frameworks of each node 10A-10D to replicate a respective weight shard, partition the replicated weight shard into a number of replicated shard portions according to the hyperparameters, and distribute the replicated shard portions of weights to other nodes 10A-10D. Each replicated shard portion may comprise data defining a distinct portion the respective weight shard (e.g., weight shard 52A of node 10A) that does not overlap with a portion of any of the other replicated shard portions originating from the same weight shard. Thus, the replicated shard portions can collectively define a full weight shard. The number of replicated shard portions created may be based on a number of nodes that utilized to perform the distributed training. For example, the number of replicated shard portions may be one less than the total number of nodes.

In the example of FIG. 2, node 10A may execute resiliency framework 28 to generate three replicated shard portions 52A-1 through 52A-3. For example, resiliency framework 28 may access storage device(s) 40 to obtain weight shard 52A and create a copy of the weight shard 52A. Resiliency framework 28 may partition the copy of the weight shard 52A into portions by dividing the weight shard 52A into three replicated shard portions 52A-1 through 52A-3. In various examples, the three segments may be substantially equal in size.

Node 10A may execute resiliency framework 28 to distribute the replicated shard portions 52A-1 through 52A-3 to nodes 10B-10D. Each node 10B-10D executes its respective resiliency framework to receive one of replicated shard portions 52A-1 through 52A-3 and store the received replicated shard portion in a respective storage device(s). In the example of FIG. 2, node 10B holds replicated shard portion 52A-1, node 10C holds replicated shard portion 52A-2, and node 10D holds replicated shard portion 52A-3. While the example herein refers to replicated shard portions 52A-1 through 52A-3, the reference numbers are intended to represent parts of a whole (e.g., 33% of the weight shard 52A) and are not intended to impart a sequential order to the replicated shard portions. Thus, for example, replicated shard portion 52A-2 may be a sequentially first portion of weight shard 52A, replicated shard portion 52A-3 may be a sequentially second portion, and replicated shard portion 52A-1 may be a sequentially final portion, or other arrangement as desired.

In some examples, the nodes 10A-10D may distribute the replicated shard portions as part of operation 212, for example, as part of the all-gather operation executed by the respective ML frameworks. In this example, distributing the replicated shard portions may not require additional communication overhead by leveraging the same operation that is performed as part of the training process. In another example, replicated shard portions may be distributed prior to a first iteration of forward propagation phase 200.

In examples, each node 10A-10D may execute its resiliency framework to update replicated shard portions held thereon based on the full layer reconstructed during step 210. For example, as described above in connection with step 210, each node 10A-10D collects weight shards held at the other nodes to reconstruct a layer. Each node 10A-10D may also execute, for example, during step 220, its resiliency framework to update replicated shard portions using the weight shards received during step 210. For example, the replicated shard portions may contain weights learned during a previous iteration of training of a current layer, which may need to be updated to the most recently learning weights. The weight shards received during step 210 may contain the most recent weights for that layer, which can be used to update the replicated weight shards portions. For example, node 10A may obtain weight shards 52B-52D during an all-gather operation 212 and execute resiliency framework 28 to update the replicated shard portions 52B-1, 52C-1, and 52D-1 using corresponding weights contained in weight shards 52B-52D, respectively. Nodes 10B-10C can similarly update respectively held replicated weight shard portions during step 220.

Figure 3:
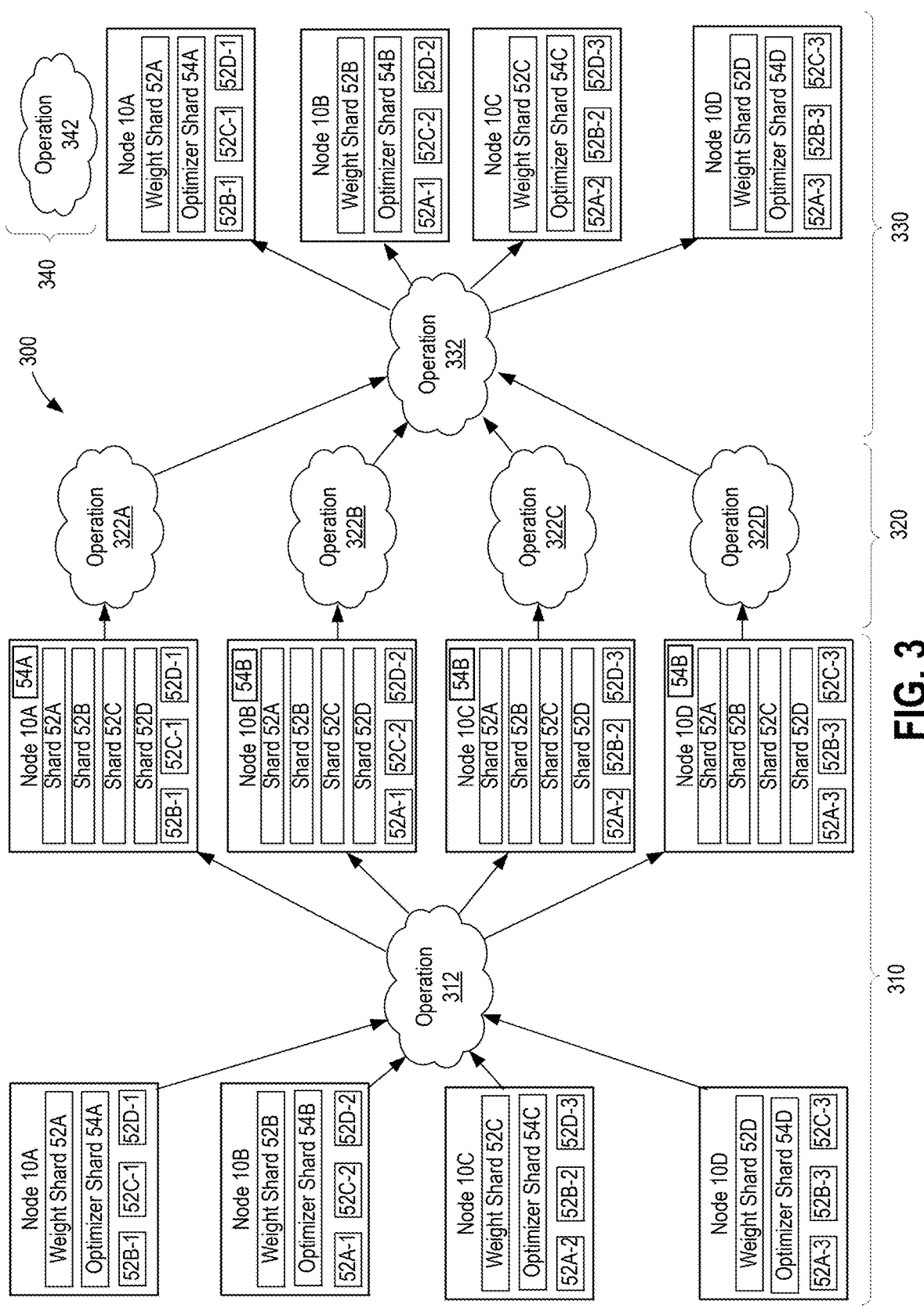
FIG. 3 is a schematic block diagram depicting a backward propagation phase in distributed training, according to example implementations of the present disclosure.

FIG. 3 is a schematic block diagram of a process flow for a backward propagation phase 300 in distributed training, according to example implementations of the present disclosure. In the example of FIG. 3, the backward propagation phase 300 can be performed by a plurality of nodes 10, as described in connection with FIG. 1. Accordingly, one or more of the operations of backward propagation phase 300 may be performed by, for example, by one or more of the application layer 22, ML framework 24, interface layer 26, and/or resiliency framework 28, as executed by processor(s) 20. In the example shown in FIG. 3, the backward propagation phase 300 is illustratively depicted as performed by the nodes 10A-10D, which may be the same nodes used to execute the forward propagation phase 200 of FIG. 2. While the example of FIG. 3 illustrates four nodes, backward propagation phase 300 can be performed by any number of nodes.

The backward propagation phase 300 shown in FIG. 3 can be performed for each layer of an ML model (e.g., model 44 of FIG. 1) to obtain gradients from a loss function for a given layer with respect to its weights by iterating backward layer-to-layer from the last layer to the first layer of the ML model. The backward propagation phase 300 can then use the gradients to update the weights according to the gradients. Backward propagation phase 300 comprises multiple operations that are illustratively depicted in FIG. 3 as grouped into steps 310, 320, 330, and 340, which can be iteratively executed for each layer. In examples, backward propagation phase 300 can be performed following the forward propagation phase 200 of FIG. 2.

In an example, at step 310 for a given layer, each node 10A-10D reconstructs the respective layer of the common ML model. For example, the ML framework at each node 10A-10D can be executed to perform an all-gather operation 312 to collect weight shards held at of the other nodes and reconstruct the full layer from the gathered weights. Step 310, in various examples, may be executed in a manner that is substantially similar to step 210 of FIG. 2.

At step 320, each node 10A-10D can execute its respective ML framework to perform operations 322A-322D. Operations 322A-322D may comprise executing a backward compute operation to obtain input gradients and weight gradients for the full reconstructed layer with respect to local inputs at each node 10A-10D. For example, node 10A may execute ML framework 24 to perform a backward compute operation as part of operations 322A to obtain input and weight gradients with respect to inputs locally held at node 10A that were utilized (and stored in storage device(s) 4)) during the forward propagation phase 200. The backward compute operation can utilize, for example but not limited to, gradient descent or variants, such as stochastic gradient descent, to obtain input gradients and weight gradients based on the local inputs for the current layer with respect to a loss function between the current layer and a layer that sequentially follows the current layer in the ML model. Similarly, nodes 10B-10D each execute a respective ML framework to perform a backward compute operation as part of operations 322B-322D to obtain input gradients and weight gradients. The backward computer operation performed during each of operations 322A-322D may utilize the same algorithm (e.g., gradient descent or variants, such as stochastic gradient descent) or different algorithms according to a desired application.

Once the input and weight gradients of a given reconstructed layer are obtained, weight shards obtained from other nodes 10A-10D can be discarded to free up space for a next iteration. For example, node 10A may execute ML framework 24 to discard, delete, or otherwise remove weight shards 52B-52D from its storage device(s) 40. Similarly, node 10B may discard weight shards 52A, 52C, and 52D; node 10C may discard weight shards 52A, 52B, and 52D; and node 10D may discard weight shards 52A, 52B, and 52C.

At step 330, each node 10A-10D may execute its respective ML framework to distribute global weight gradient among the nodes 10A-10D via operation 332. Operation 332 may comprise a reduce-scatter operation. For example, operation 332 perform a reduce operation that collects sets of local weight gradients obtained by each node 10A-10D and aggregate the sets of local weight gradients together to produce a set of global weight gradients. For example, during step 320, each node 10A-10D computed weight gradients for the fully reconstructed layer with respect to each nodes local inputs. As a result, each node 10A-10D obtained local weight gradients for each weight shard 52A-52D with respect to different inputs that are local to each node 10A-10D. Each set of local weight gradients obtained at given node may comprise one or more local weight gradients corresponding to each weight shard 52A-52D. The reduce operation of operation 322 gathers the sets of local weight gradients from each node 10A-10D and aggregates (e.g., sums) the sets of local weight gradients on a weight shard basis. For example, local weight gradients corresponding to weight shard 52A may be obtained from each node 10A-10D, which may be summed (or other aggregation function, such as but not limited to, average, minimum, maximum, etc.) together to obtain a global weight gradient for weight shard 52A. Similarly, global weight gradients can be obtained for each weight shard 52B-52D, which together with weight shard 52A may constitute a set of global weight gradients.

The set global weight gradients may then be scattered across each of the nodes 10A-10D. For example, global weight gradients for each weight shard may be scattered to the node associated with the respective shard. As an illustrative example, global weight gradients for weight shard 52A can be scattered to node 10A, global weight gradients for weight shard 52B can be scattered to node 101B, global weight gradients for weight shard 52C can be scattered to node 10C, and global weight gradients for weight shard 52D can be scattered to node 10D.

At step 340, each node 10A-10D may execute its respective ML framework to update weights of a respective weight shard with respect to the global weight gradients obtained at step 330. For example, node 10A may execute ML framework 24 to performed operation 342, which may update weights of weight shard 52A with respect to the global weight gradients for the weight shard 52A obtained from step 330. Similarly, node 10B may update weights of weight shard 52B, node 10C may update weights of weight shard 52C, and node 10D may update weights of weight shard 52D. In examples, operation 342, performed by each node 10A-10D, may include an optimization algorithm, which uses optimizer states contained in optimizer shards 54A-54D held at a respective node, to compute updated weights with respect to the global weight gradients. For example, node 10A may hold an optimizer shard that contains optimizer states local to node 10A can be applied as an optimization algorithm to update weight shard 52A with respect to the global weight gradients. Similarly, nodes 10B-10D may hold optimizer shards that can be used to update weight shard 10B-10D, respectively.

In examples disclosed herein, as shown in FIG. 3, each node 10A-10D can hold replicated shard portions associated with other nodes. As described above, each node 10A-10D may execute its resiliency framework to create and distribute the replicated shard portions. Additionally, as described above in connection with FIG. 2, each node 10A-10D may execute its resiliency framework, during step 320, to perform operations that update replicated shard portions held thereon based on the weight shards obtained from other nodes during step 310.

Figure 4:
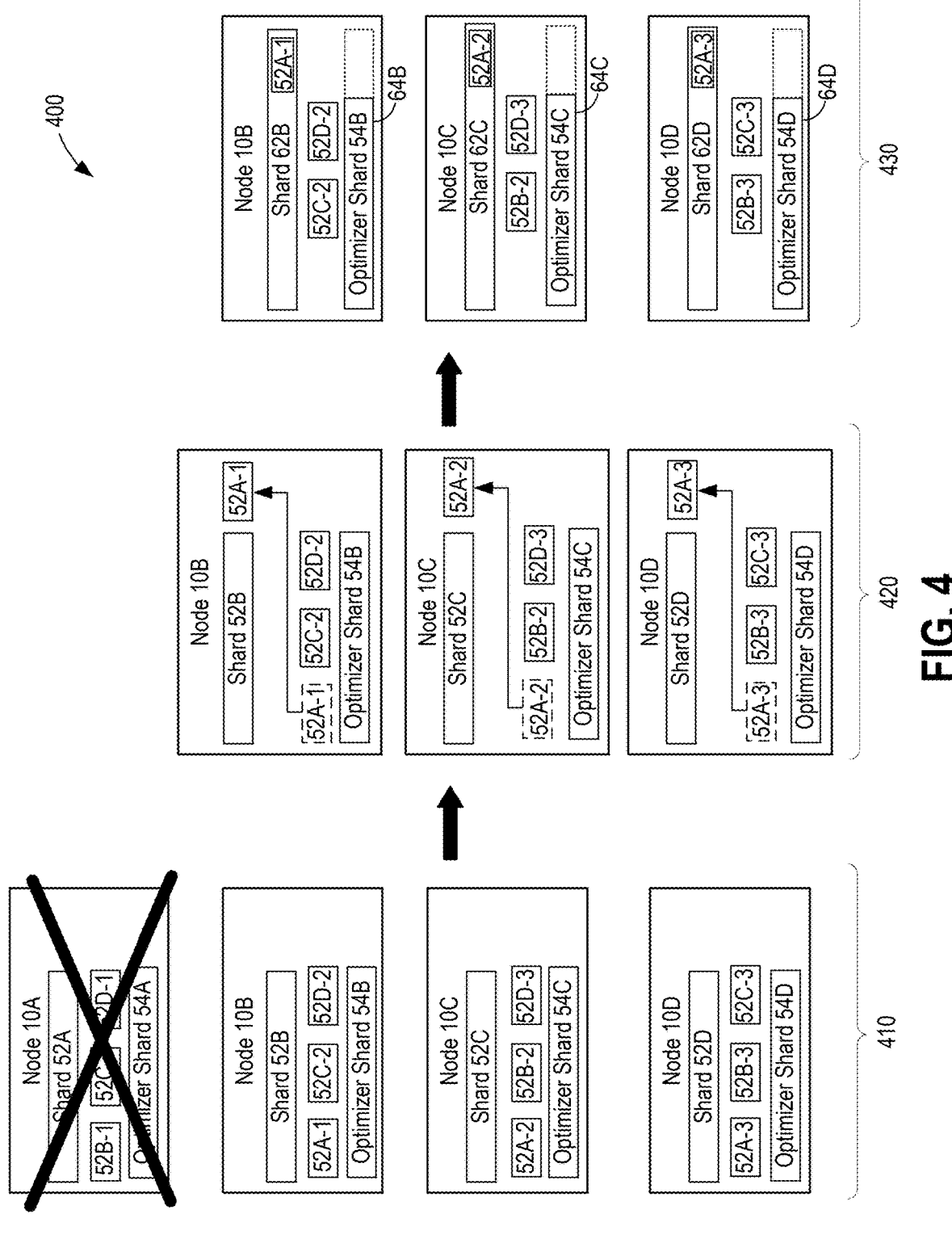
FIG. 4 is a schematic block diagram depicting a process flow for providing resiliency to failures in distributed training, according to example implementations of the present disclosure.

FIG. 4 is a schematic block diagram depicting a process flow 400 for providing resiliency to node failures in distributed training, according to example implementations of the present disclosure. In the example of FIG. 4, the process flow 400 may be performed by a plurality of nodes 10, as described in connection with FIG. 1. Accordingly, one or more of operations shown in FIG. 4 may be performed by, for example, by one or more of the application layer 22, ML framework 24, interface layer 26, and/or resiliency framework 28, as executed by processor(s) 20. The process flow 400 of FIG. 4 is illustratively depicted as performed by four nodes 10A-10D. However, the resiliency provided by the process flow 400 shown in FIG. 4 can be performed by any number of nodes.

In examples, the process flow 400 may be performed at any point during a distributed training by utilizing the replicated shard portions held at each of the nodes 10A-10D, for example, during forward propagation phase 200 and/or backward propagation phase 300. By distributing a weight shard held at one node (e.g. weight shard 52A held by node 10A) across the other nodes (e.g., nodes 10B-10D) as replicated shard portions (e.g., replicated shard portions 52A-1 through 52A-3), the examples herein can provide for resiliency in the event of a failure of, for example, node 10A (e.g., functional failures and the like as described above in connection with FIG. 1). Similarly, the examples herein can be resilient to a failure of the other nodes by distributing respective replicated shard portions.

For example, at step 410, a functional failure of a node may be detected according to checks (e.g., rules 46). In an illustrative example, node 10A may fail or become unavailable for the distributed training for any reason, thereby rendering node 10A as non-participating and/or non-functioning (as evidenced by the cross-out). The remaining functional nodes 10B-10D may be notified of the failure by any desired notification technique, as described above, which may be considered as detecting a failure of node 10A.

Based on the detected functional failure (e.g., responsive to detecting that node 10A has failed), each remaining functional node (e.g., nodes 10B-10D) may update its weight shard to include a replicated shard portion corresponding to the failed node. For example, each functional node may execute its resiliency framework to move a replicated shard portion corresponding to the failed node (e.g., node 10A) to its respective weight shard, at step 420. At step 430, each functional node may execute its resiliency framework to update its respective weight shard by merging the replicated shard portion corresponding to the failed node with its respective weight shard. The resulting updated weight shard may then be used for training (e.g., as an updated training shard).

As an illustrative implementation, each remaining functional node (e.g., nodes 10B-10D) may perform step 420 by executing a respective resiliency framework to locate a replicated shard portion corresponding to the failed node. In some examples, replicated shard portions may be stored at each node in association with a unique identifier of the compute node (e.g., a MAC address, IP address, or any other unique identifier) from which the replicated shard portion originated (e.g., was received). That is, for example, replicated shard portion 52A-1 may be stored in storage device(s) at node 10B tagged or otherwise associated with the unique identifier of node 10A, replicated shard portion 52A-2 may be stored in storage device(s) at node 10C tagged or otherwise associated with the unique identifier of node 10A, and replicated shard portion 52A-3 may be stored in storage device(s) at node 10D tagged or otherwise associated with the unique identifier of node 10A. Each replicated shard portion originating from other nodes may be similarly tagged or associated with an identifier of the originating node. Thus, upon detecting a node failure, the resiliency framework of remaining functional nodes may locate a replicated shard portion corresponding to a failed node in respective storage device(s).

Once each remaining functional node (e.g., nodes 10B-10D in this example) locates the replicated shard portion (e.g., replicated shard portion 52A-1 through 52A-3) received from the failed node (e.g., node 10A in this example), the remaining functional nodes may execute their respective resiliency frameworks to move the located replicated shard portions to respective weight shards. The resiliency framework of each remaining functional node may then operate to merge the replicated shard portion with its respective weight shard, thereby generating an updated weight shard. For example, as shown in FIG. 4 at step 430, node 10B may execute its resiliency framework to merge replicated shard portion 52A-1 with weight shard 52B to generate updated weight shard 62B. Similarly, node 10C may merge replicated shard portion 52A-2 with weight shard 52C to generate updated weight shard 62C and node 10D may merge replicated shard portion 52A-3 with weight shard 52D to generate updated weight shard 62D.

Accordingly, weight shard 52A that was held by failed node 10A can be saved by merging with the other weight shards of the remaining functional nodes. Thus, the weights of weight shard 52A can be maintained and updated by the remaining functional nodes 10B-10D. As a result, the distributed machine learning performed by the nodes 10A-10D can be resilient to failure of node 10A and proceed uninterrupted via nodes 10B-10D using updated weight shards 62B-62D as updated training shards.

According to various examples, the updated weight shard 62B-62D may be increased in size by the same amount, for example, due to each replicated shard portion 52A-1 through 52A-3 being substantially equal in size. Thus, the amount of work and communication distributed to the remaining functional nodes can be equally shared and a single node may not be overly burdened.

In examples, to recover the optimizer shard of the failed node, the resiliency framework of each remaining functional node may initialize the optimizer states for a respective updated weight shard. For example, when node 10A fails, the optimizer states held by node 10A may be lost. To recover the lost optimizer states (illustratively shown in FIG. 4 as dashed line boxes), nodes 10B-10D may execute respective resiliency frameworks to obtain (e.g., compute) updated optimizer shards 64A-64D. For example, each node 10B-10D may execute its resiliency framework to set optimizer states for the respective replicated shard portion to a default value (e.g., zero) and compute the optimizer states through operation of the backward propagation phase 300. Thus, the optimizer states for optimizer shard 54A can be recovered and updated with optimizer shards 64B-64D, in this example.

To ensure the distributed training is resilient to not only a current node failure (e.g., node 10A as described in connection with FIG. 4), but also a subsequent node failure (e.g., one of nodes 10B-10D in the example of FIG. 4), implementations of the present disclosure can update replicated shard portions based on the updated weight shards. More particularly, replicated shard portions can be updated as part of an all-gather operation executed, for example, during forward propagation phase 200 and/or backward propagation phase 300. That is, the updated weight shards can be distributed during steps 210 and/or 310 due to distributing weight shards amongst the nodes to reconstruct a given layer. As described above, the weights contained in the distributed weight shards can then be used to update respective replicated shard portions at each node.

Figure 5:
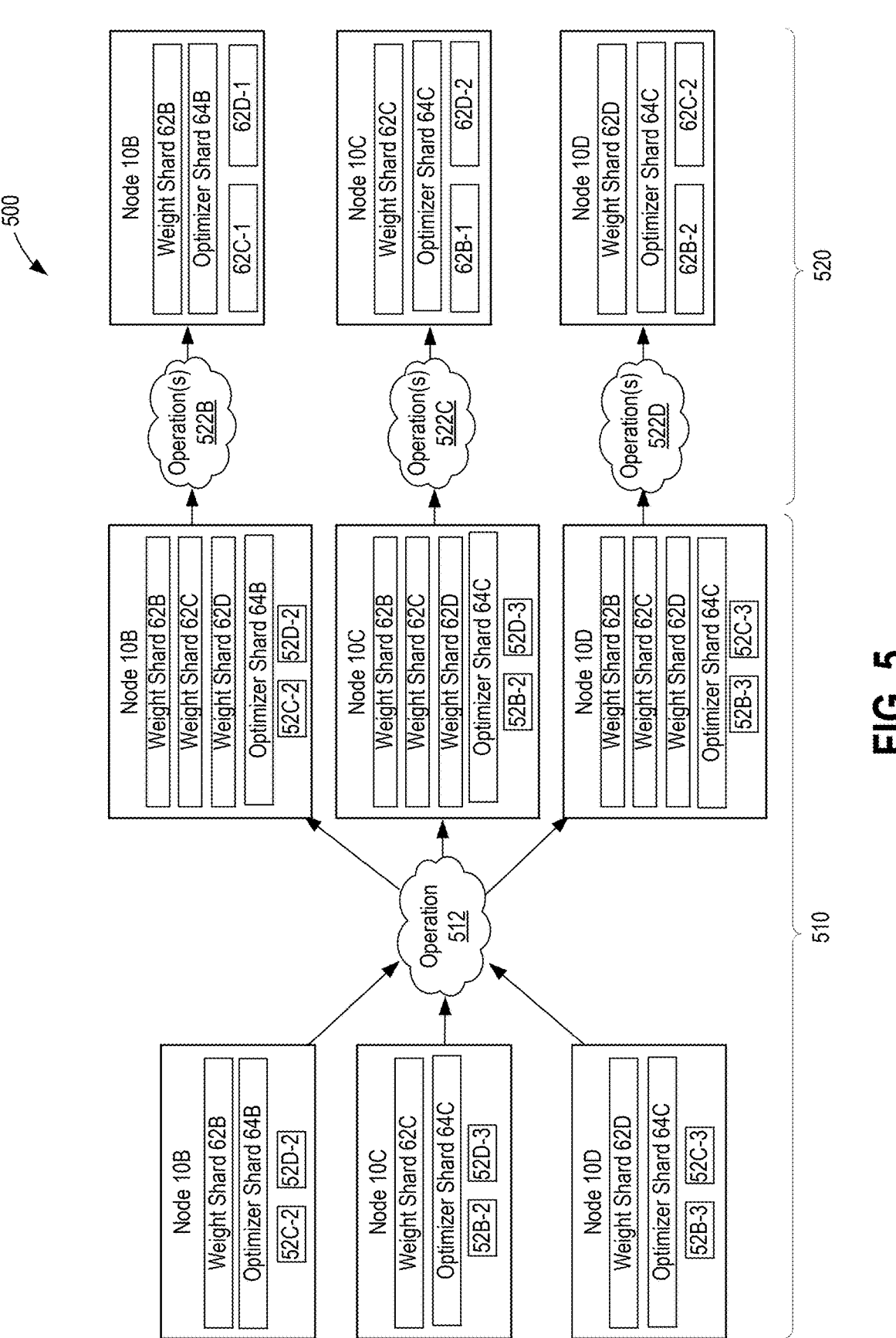
FIG. 5 is a schematic block diagram depicting a process flow of ensuring continued resiliency from node failures in distributed training, according to example implementations of the present disclosure.

For example, FIG. 5 shows a schematic block diagram depicting a process flow of ensuring continued resiliency from node failures in accordance with examples of the present disclosure. The process flow 500 shown in FIG. 5 may follow updating of weight shards at step 430 of FIG. 4. As such, in the example of FIG. 5, the process flow 500 is performed by the remaining functional nodes 10B-10D. Accordingly, one or more of operations shown in FIG. 5 may be performed by, for example, by one or more of the application layer 22, ML framework 24, interface layer 26, and/or resiliency framework 28, as executed by processor(s) 20. While, process flow 500 is illustratively depicted as performed by three nodes 10B-10D, the resiliency provided by the process flow 500 can be performed by any number of nodes.

As described above in connection with FIG. 4, node 10A may have failed and nodes 10B-10D may have generated respective updated weight shards 62B-62D based on replicated shard portions received from node 10A. However, at the outset of step 510, the replicated shard portions held at each remaining functional node—other than those corresponding to node 10A—may be unaltered. That is, for example, node 10B may hold replicated shard portions 52C-2 and 52D-2, node 10C may hold replicated shard portions 52B-2 and 52D-3, and node 10D may hold replicated shard portions 52B-3 and 52C-3. Thus, replicated shard portions 52B-1, 52C-1, and 52D-1 may have been lost due to the failure of node 10A and replicated shard portions for weight shards 62B-62D may be incomplete or not present (e.g., the portions of weight shards 62B-62D corresponding to replicated shard portions 52A-1 through 52A-3 may not be represented in a replicated weight shard currently held at a node).

To ensure that the distributed training performed by the remaining functional nodes 10B-10D is resilient to future node failures, each remaining functional node 10B-10D can execute its resiliency framework to update replicated shard portions through steps 510 and 520. The steps 510 and 520 may be performed as part of a forward propagation phase 200 or backward propagation phase 300 following failure of a node (e.g., node 10A). In each case, forward propagation phase 200 or backward propagation phase 300 may be performed as described above, except with only the remaining functional nodes (e.g., nodes 10B-10D, as node 10A is no longer present in the process due) and modified as set forth below to update replicated shard portions.

For example, at step 510, each node 10B-10D performs an all-gather operation 512 to collect weight shards held at the other nodes and reconstructs the layer from the gathered weights. The all-gather operation 512 may be the all-gather operation 212 or all-gather operation 312 described above. Thus, each node 10B-10D hold weight shards 62B-62D following operation 512.

At step 520, each node 10B-10D may execute its resiliency framework to perform operations 522B-522D. Operations 522B-522D may include updating replicated shard portions held at each node 10B-10D using the weight shards received during step 510. The operations 522B-522D may be executed as part of operations 222B-222D or operations 322B-322D described above, which may include updating the replicated shard portions as described above in connection with FIGS. 2 and 3.

For example, each node 10B-10D may execute a respective operation 522B-522D to utilize updated shards 62B-62D, obtained during step 510, to update replicated shard portions held at each node 10B-10D. The updated weight shards 62B-62D received at step 510 may contain the most recent weights for that layer, which can be used during step 520 to update and resize the replicated shard portions. For example, node 10B may obtain weight shards 62C and 62D during the all-gather operation 512 and execute its resiliency framework to update replicated shard portions 52C-2, 52D-2 so to include the weights of the updated weight shards 62C and 62D, thereby creating updated replicated shard portions 62C-1 and 62D-1. Similarly, node 10C can update replicated shard portions 52B-2, 52D-3 to create updated replicated shard portions 62B-1 and 62D-2 and node 10D can update replicated shard portions 52B-3, 52C-3 to create updated replicated shard portions 62B-2 and 62C-2.

FIG. 6 illustrates an example computing component that may be used to implement node failure resiliency in distributed training in accordance with various embodiments. Referring now to FIG. 6, computing component 600 may be, for example, a server computer, a controller, or any other similar computing component capable of processing data. In the example implementation of FIG. 6, the computing component 600 includes a hardware processor 602 and machine-readable storage medium 604. In an example, computing component 600 may be an example of one of nodes 10 of FIG. 1. In another example, hardware processor 602 may be a plurality of hardware processors coupled to a plurality of machine-readable storage mediums, which may represent a plurality of nodes 10 of FIG. 1.

Hardware processor 602 may be one or more central processing units (CPUs), semiconductor-based microprocessors, and/or other hardware devices suitable for retrieval and execution of instructions stored in machine-readable storage medium 604. Hardware processor 602 may fetch, decode, and execute instructions, such as instructions 606-612, to control processes or operations for failure resiliency. As an alternative or in addition to retrieving and executing instructions, hardware processor 602 may include one or more electronic circuits that include electronic components for performing the functionality of one or more instructions, such as a field, but not limited to, Graphics Processing Units (GPUs), programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-612.

Hardware processor 602 may execute instruction 606 store a first shard of ML model states of a common ML model at a first compute node. In examples, the ML model states comprise weights of the common ML model. For example, the first shard comprises a subset or segment of the weights may be used to define the common ML model, as described above in connection with FIGS. 1-5.

Hardware processor 602 may execute instruction 608 to receive, by the first compute node, a first plurality of shard portions from a first plurality of compute nodes. For example, the first compute node may be included as part of a cluster of compute nodes of a distributed training network, such as the distributed training network described above in connection with FIG. 1. The cluster of compute nodes may include the first compute node and the first plurality of compute nodes, in this example. Each shard portion may be received, by the first compute node, from a respective compute node of the first plurality of compute nodes. That is, for example, each of the first plurality of compute nodes of may provide a shard portion to the first compute node that may collectively constitute the first plurality of shard portions. Each shard portion may be a replica of a portion of a shard of the ML model states of the common ML model stored at the each respective compute node of the plurality of compute nodes. For example, as described above in connection with FIGS. 1-5, each of the first plurality of compute nodes may store a shard of the ML model states (e.g., a distinct segment of the ML model states that define the common ML model), each of which can be replicated and partitioned into shard portions and shared with the first compute node.

In examples, the first plurality of shard portions may be received during one of: a forward propagation and a backpropagation of training the common ML model, as described above in connection with FIGS. 2-5.

In examples, the first compute node may be configured to provide a second plurality of shard portions to the first plurality of compute nodes. For example, the hardware processor 602 may execute instructions to that cause the first compute node to replicate the first shard, partition the replicated first shard into the second plurality of shard portions, and transmit the second plurality of shard portions to the first plurality of compute nodes. Transmission of the second plurality of shard portions may be performed during an all-gather operation performed during one of: a forward propagation and a backpropagation of training the common ML model.

Hardware processor 602 may execute instruction 610 to, responsive to a failure of a compute node of the first plurality of compute nodes, update the first shard by merging a shard portion corresponding to the failed compute node with the first shard. For example, a failure of at least one of the first plurality of compute nodes may be detected, as described above in connection with FIGS. 1 and 4. Responsive to detecting the failure (e.g., receiving a notification or alert), the first compute node can update the first shard by merging a shard portion of the first plurality of shard portions corresponding to the failed node of the first plurality of shard nodes (e.g., the shard portion received from or otherwise originating from the failed node) with the first shard.

In examples, each of a second plurality of compute nodes may be configured to update a respective shard of the first plurality of shards with a shard portion corresponding to the failed compute node in response to detecting the failure. In this example, the second plurality of compute nodes may be the first plurality of compute nodes with the failed compute node removed.

In examples, hardware processor 602 may execute instructions to receive, by the first compute node from the second plurality of compute nodes, a third plurality of shard portions. Each shard portion of the third plurality of shard portions may be a replica of a portion of a respective updated shard stored at the respective compute node of the second plurality of compute nodes. The first compute node may partition the updated first shard into a fourth plurality of shard portions and transmit the fourth plurality of shard portions to the second plurality of compute nodes, for example, during an all-gather operation performed during one of: a forward propagation and a backpropagation of training the common ML model.

Hardware processor 602 may execute instruction 612 to train the common ML model based on the updated first shard. For example, as described above in connection with FIGS. 4 and 5 in view of FIGS. 2 and 3, the updated first shard can be used as a training shard for future iterations of a backward propagation phase and/or forward propagation phase of a distributed training process. In examples, training the common ML model may be performed using the updated first shard, as well as the updated first plurality of shards, as described in connection with FIG. 5. Thus, the distributed training performed by the distributed training network of the first compute node and the first plurality of compute nodes can be resilient to a node failure, such that the learning can continue uninterrupted.

FIG. 7 illustrates another example computing component that may be used to implement node failure resiliency in distributed training in accordance with various embodiments. Referring now to FIG. 7, computing component 700 may be, for example, a server computer, a controller, or any other similar computing component capable of processing data. In the example implementation of FIG. 7, the computing component 700 includes a hardware processor 702 and machine-readable storage medium 704. In an example, computing component 700 may be an example of one of nodes 10 of FIG. 1.

Hardware processor 702 may be one or more central processing units (CPUs), semiconductor-based micropro-cessors, and/or other hardware devices suitable for retrieval and execution of instructions stored in machine-readable storage medium 704. Hardware processor 702 may fetch, decode, and execute instructions, such as instructions 706-712, to control processes or operations for failure resiliency. As an alternative or in addition to retrieving and executing instructions, hardware processor 702 may include one or more electronic circuits that include electronic components for performing the functionality of one or more instructions, such as, but not limited to, Graphics Processing Units (GPUs), a field programmable gate array (FPGA), applica-tion specific integrated circuit (ASIC), or other electronic circuits.

A machine-readable storage medium, such as machine-readable storage medium 704, may be any electronic, mag-netic, optical, or other physical storage device that contains or stores executable instructions. Thus, machine-readable storage medium 704 may be, for example, Random Access Memory (RAM), non-volatile RAM (NVRAM), an Electri-cally Erasable Programmable Read-Only Memory (EE-PROM), a storage device, an optical disc, and the like. In some embodiments, machine-readable storage medium 704 may be a non-transitory storage medium, where the term "non-transitory" does not encompass transitory propagating signals. As described in detail below, machine-readable storage medium 704 may be encoded with executable instructions, for example, instructions 706-712.

Hardware processor 702 may execute instruction 706 receive each of a first plurality of shard portions from a respective compute node of a first plurality of compute nodes, wherein each shard portion is a portion of a respective shard of the ML model states associated with the respective compute node. In examples, the ML model states comprise weights of the ML model. For example, each shard associated with a respective compute node may comprise a subset or segment of the weights used to define the common ML model, as described above in connection with FIGS. 1-5. The computing component 700 may receive portions of these shards from respective compute nodes of the first plurality of compute nodes, which may have replicated (e.g., copied) their respective shards and divided the replicated shards into portions. Each of the first plurality of compute nodes may transmit a portion of its replicated shard to the computing component 700 for storage in machine-readable storage medium 704, as described above in connection with FIGS. 1-5.

Hardware processor 702 may execute instruction 708 to, based on detecting a failure of at least one of the compute nodes of the first plurality of compute nodes, recover a shard corresponding to the failed compute node by updating a first shard with the shard portion associated with the failed compute node. The first shard, which may be associated with the computing component 700, may be a segment of the ML model states, similar to each shard of the first plurality of shards, as described above. Instruction 708 may be executed to locate a portion of the shard associated with the failed node stored in machine-readable storage medium 704 and merge the located portion with the first shard of the computing component 700, for example, as described above in connection with FIGS. 3 and 4. Thus, at least the portion of the shard associated with the failed node can be recovered, which would otherwise have been lost due to the failure. In examples, each compute node of the first plurality of compute nodes, other than the failed node (e.g., a subset of the first plurality of compute nodes that does not include the failed node), may similarly hold a portion of the shard associated with the failed node that can be located and merged with a shard associated with each compute node.

Hardware processor 702 may execute instruction 710 to transmit a second plurality of shard portions of the updated first shard to a subset of the first plurality of compute nodes during one of: a forward propagation and a backpropagation of training the ML model. For example, as described in connection with FIGS. 3 and 4, the second plurality of shard portions can be transmitted to the subset of the first plurality of compute nodes during an all-gather operation performed during one of: a forward propagation and a backpropagation of training the ML model. In examples, the ML model can be trained based, in part on, the first shard during a first iteration of fully sharded data parallelism and based, in part, on the updated first shard during a second (e.g., subsequent) iteration of the fully sharded data parallelism, for examples, as described above in connection with FIGS. 1-5.

While the examples disclosed herein are described with reference to providing resiliency with respect to one compute node failing, malfunctioning, or otherwise becoming functionally unavailable for distributed training, the examples herein are not intended to be limited to a single functional failure. The examples disclosed herein can be extended to multiple simultaneous functional failures, whereby more than one compute node becomes functionally unavailable for distributed training. In this case, computes nodes (e.g., compute nodes 10A-10G of FIG. 1) may store multiple replicated shard portions for each of the other compute nodes. For example, with reference FIGS. 2 and 3, compute node 10A may store a first set of replicated shard portions corresponding to compute node 101B, a first set of replicated shard portions corresponding to compute node 10C, and a third set of replicated shard portions corresponding to compute node 10D. Similarly, compute nodes 10B-10D may store multiple sets of replicated shard portions, where each set corresponds to particular compute node. Thus, in the event of a functional failure of compute nodes 10A and 10B, for example, replicated shard portions for each compute node 10A and 10B stored on compute nodes 10C and 10D can be merged with weight shards 52C and 52D, respectively, to generate updated weight shards that provide resiliency for weight shards 52A and 52B, in this example. The functions discussed in connection with FIGS. 1-7 may operate in a substantially similar manner, except for that multiple compute nodes may have become functionally unavailable and that their respective weight shards can be recovered by merging with the weight shards of remaining functional compute nodes.

Figure 8:
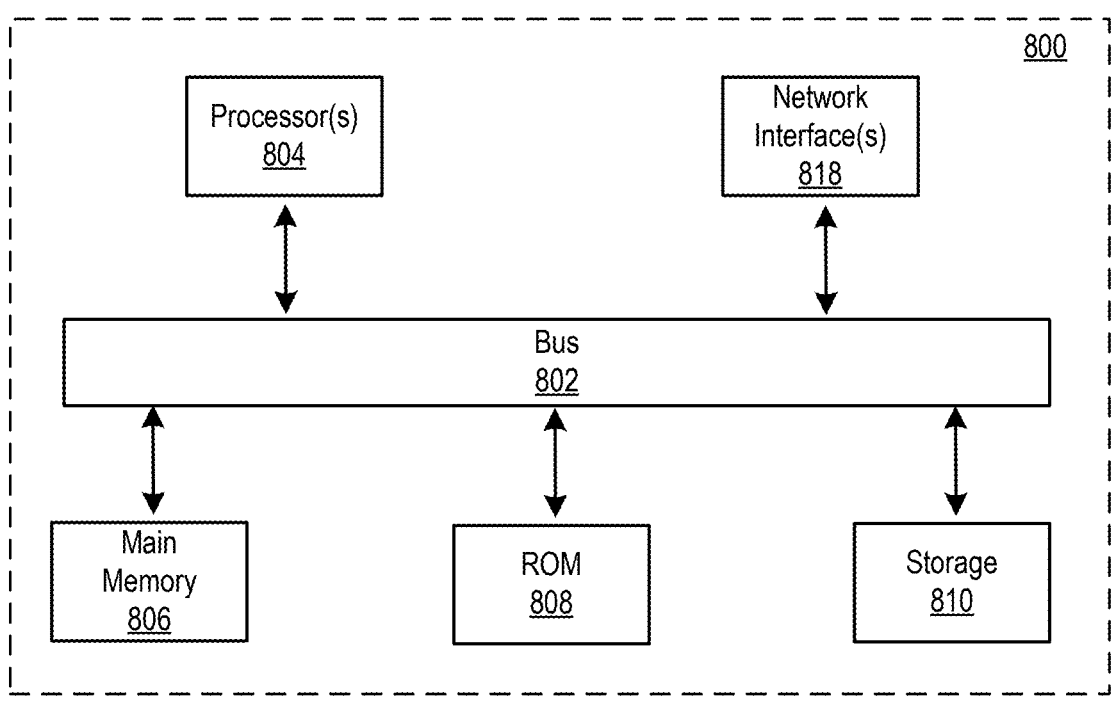
FIG. 8 is an example computer system that may be used to implement various features of distributed training failure of the present disclosure.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors. The computer system 800 may be implemented as, for example, a compute node 10 of FIG. 1.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions. The main memory 806, as well as other memory components, may store instructions that, when executed by processor 804, causes the process or 804 to perform one or more operations described in connection with FIGS. 1-5.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a network interface 818 (also referred to as a communication interface)

coupled to bus 802. Network interface 818 provides a two-way data communication coupling to one or more network links that are connected to one or more local networks. For example, network interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 818, which carry the digital data to and from computer system 800, are example forms of transmission media.

The computer system 800 can send messages and receive data, including program code, through the network(s), network link and network interface 818. In the Internet example, a server might transmit a requested code for an application program through the Internet, the ISP, the local network and the network interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system comprising:
a first plurality of compute nodes, each of the first plurality of compute nodes storing a shard of a first plurality of shards of machine learning (ML) model states of a common ML model; and
a first compute node storing a first shard of ML model states of the common ML model, the first compute node configured to:
store a first plurality of shard portions, each shard portion being received from a respective compute node of the first plurality of compute nodes and being a replica of a portion of a respective shard, of the first plurality of shards, stored at the respective compute node; and
responsive to a failure of a compute node of the first plurality of compute nodes, update the first shard with a shard portion corresponding to the failed compute node,
wherein the common ML model is trained based on the updated first shard.

2. The system of claim 1, wherein the ML model states comprise weights of the common ML model.

3. The system of claim 1, wherein the first compute node is further configured to:
replicate the first shard;
partition the replicated first shard into a second plurality of shard portions; and transmit the second plurality of shard portions to the first plurality of compute nodes.

4. The system of claim 3, wherein the first compute node transmits the second plurality of shard portions to the first plurality of compute nodes during an all-gather operation performed during one of: a forward propagation and a backpropagation of training the common ML model.

5. The system of claim 3, wherein the second plurality of shard portions comprises a number of equal sized portions of the first shard, wherein each equal sized portion of the first shard is transmitted to a compute node of the first plurality of compute nodes.

6. The system of claim 5, wherein the number of equal sized portions is equal to the number of compute nodes of the first plurality of compute nodes.

7. The system of claim 1, wherein, responsive to the failure of the compute node of the first plurality of compute nodes, each of a second plurality of compute nodes is configured to:
update a respective shard of the first plurality of shards with a shard portion corresponding to the failed compute node,
wherein the second plurality of compute nodes are the first plurality of compute nodes without the failed compute node.

8. The system of claim 7, wherein the first compute node is further configured to:
receive, from the second plurality of compute nodes, a third plurality of shard portions, each shard portion of the third plurality of shard portions being a replica of a portion of a respective updated shard stored at the respective compute node of the second plurality of compute nodes;
partition the updated first shard into a fourth plurality of shard portions; and
transmit the fourth plurality of shard portions to the second plurality of compute nodes.

9. The system of claim 1, wherein the first compute node is configured to:
store sets of shard portions, each set of shard portions comprising multiple shard portions received from a respective compute node of the first plurality of compute nodes and being replicas of portions of a shard, of the first plurality of shards, corresponding to the respective compute node; and
responsive to a failure of two or more compute nodes of the first plurality of compute nodes, update the first shard with the sets of shard portions corresponding to the two or more compute nodes.

10. A non-transitory computer-readable medium including instructions that when executed by one or more processors cause the one or more processors to perform a method comprising:
storing a first shard of machine learning (ML) model states of a common ML model at a first compute node;
receiving, by the first compute node, a first plurality of shard portions from a first plurality of compute nodes, each shard portion being received from a respective compute node of the first plurality of compute nodes and being a replica of a portion of a respective shard of the ML model states of the common ML model stored at the respective compute node;
responsive to a failure of a compute node of the first plurality of compute nodes, updating the first shard by merging a shard portion corresponding to the failed compute node with the first shard; and training the common ML model based on the updated first
shard.

11. The non-transitory computer-readable medium of
claim 10, wherein the ML model states comprise weights of
the common ML model.

12. The non-transitory computer-readable medium of
claim 10, wherein the first compute node receives the first
plurality of shard portions during an all-gather operation
performed during one of: a forward propagation and a
backpropagation of training the common ML model.

13. The non-transitory computer-readable medium of
claim 10, wherein the method further comprises:

replicating the first shard;

partitioning the replicated first shard into a second plu-
rality of shard portions; and transmitting the second
plurality of shard portions to the first plurality of
compute nodes.

14. The non-transitory computer-readable medium of
claim 13, wherein the method further comprises:

transmitting, by the first compute node, the second plu-
rality of shard portions to the first plurality of compute
nodes during an all-gather operation performed during
one of: a forward propagation and a backpropagation of
training the common ML model.

15. The non-transitory computer-readable medium of
claim 13, wherein partitioning the first shard into the second
plurality of shard portions comprises:

partitioning the replicated first shard into a number of
equal sized portions, wherein each equal sized portion
of the first shard is transmitted to a compute node of the
first plurality of compute nodes.

16. The non-transitory computer-readable medium of
claim 15, wherein the number of equal sized portions is
equal to the number of compute nodes of the first plurality
of compute nodes.

17. The non-transitory computer-readable medium of
claim 10, wherein the method further comprises:

responsive to the failure of the compute node of the first
plurality of compute nodes, updating, by each of a
second plurality of compute nodes, a respective shard of the first plurality of shards with a shard portion
corresponding to the failed compute node, the second
plurality of compute nodes being the first plurality of
compute nodes without the failed compute node.

18. A compute node comprising:

a memory storing instructions and storing a first shard of
machine learning (ML) model states of an ML model;
and a processor operatively connected to the memory and
configured to execute the instructions to:

receive each of a first plurality of shard portions from
a respective compute node of a first plurality of
compute nodes, wherein each shard portion is a
portion of a respective shard of the ML model states
associated with the respective compute node;

based on detecting a failure of at least one compute
node of the first plurality of compute nodes, recover
a shard corresponding to the at least one compute
node by updating the first shard with the shard
portion associated with the at least one compute
node; and transmit a second plurality of shard portions of the
updated first shard to a subset of the first plurality of
compute nodes during one of: a forward propagation
and a backpropagation of training the ML model.

19. The compute node of claim 18, wherein the second
plurality of shard portions are transmitted to the subset of the
first plurality of compute nodes during an all-gather opera-
tion.

20. The compute node of claim 18, wherein the processor
is further configured to execute the instructions to:

train the ML model based in part on the first shard during
an iteration of fully sharded data parallelism; and train the ML model based in part on the updated first shard
during a subsequent iteration of the fully sharded data
parallelism.

* * * * *